Figure 1:
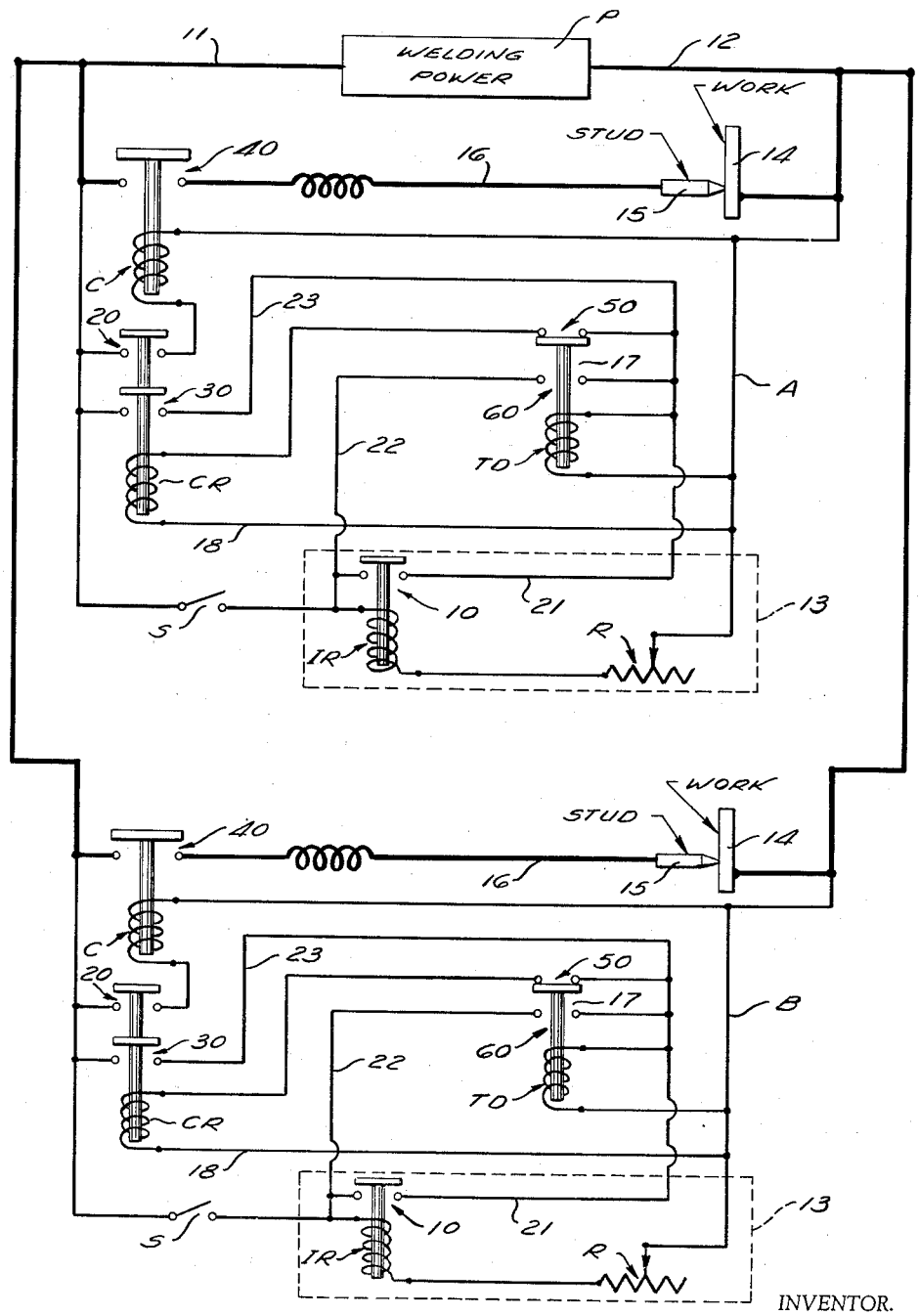

INVENTOR.
PAUL A. GLORIOSO
BY PYLE & FISHER
ATTORNEYS

United States Patent Office 2,969,483
Patented Jan. 24, 1961

2,969,483

INTERLOCKING CONTROL UNIT

Paul A. Glorioso, Lorain, Ohio, assignor to Nelson Stud Welding Div.

Filed Oct. 19, 1959, Ser. No. 847,210

4 Claims. (Cl. 315—362)

This invention relates in general to protective devices for preventing operation of electrical equipment whenever line voltage is less than the prescribed necessary value and relates more specifically to a self-contained interlock system carried by each device, such as a drawn arc stud welder, in order to enable operation of a multiple number of such devices from one power source.

It is common practice to operate a multiple number of electrical devices from one power source and in the art of end welding of studs by the drawn arc welding technique it has been the practice to supply a welding generator and operate several welding guns from this one supply. It is not very frequent that two operators will press the gun button to initiate a welding cycle at the same instant. However, it does happen. In such event, each gun produces a faulty weld. Since faulty welds are intolerable this invention is provided to prevent faulty welds by a simple and expeditious development. Prior attempts to prevent simultaneous initiation of a work cycle in two separate guns have required a cable connection between the two control units in order to turn off all associated guns whenever one gun is in operation. Obviously, such interlocking by cable connection is cumbersome and presents a definite hindrance to the operator.

Hence, it is the principal object of this invention to prevent initiation of operation of an electrical device whenever the available line voltage is less than the desired amount.

More specifically, it is the object of this invention to provide means associated with each one of a plurality of drawn arc welding devices to permit operation of a plurality of the welders from one power source but with the assurance that only one such device will operate at any one time and hence assure proper initiating voltage for the weld cycle of each welder.

Another object of this invention is to eliminate bulky cable controls between several welders operating from one source.

Other objects and a fuller understanding of the invention may be had by referring to the following description and claims taken in conjunction with the accompanying drawing in which:

The single figure is a schematic illustration of a wiring diagram of two separate drawn arc stud welding devices connected in parallel to a common source of welding power.

The art of drawn arc end welding, popularly referred to as stud welding, is quite well known and classified and hence the drawing sets forth the customary schematic wiring diagram only without illustration of a specific welding device. In fact, the present invention may be modified to protect devices other than stud welding tools. For the purpose of setting forth the invention in an environment for which it was designed, reference is made to welding mechanisms as shown in United States Patent Reissue 22,310 and United States Patent No. 2,814,716.

The basic principles upon which stud welding devices now operate are quite commonly understood. A stud is positioned close to a workpiece to which it is to be welded. Thereafter a welding arc is established between the stud and workpiece for a timed interval to melt a part of the workpiece and the end of the stud. Finally, the stud is moved to the workpiece and seated in the molten pool. After the metal re-hardens, a perfect weld joint is established. There are many modifications of this basic concept and, in fact, there are end welding devices which do not follow this precise description.

Referring now to the drawing, letter A indicates the wiring circuit of one welding device and the letter B indicates another identical welding device. It is not necessary that the two welding devices be identical. However, the drawing illustrates two such devices in order to emphasize the fact that this invention is directed to an interlock device carried by an individual welding tool which is useful whenever two such tools or more are operated from a single welding power source.

The source of welding power is indicated by the rectangular block indicated by the letter P. Generally, this power source will be a generator of some convenient type applicable to serve the needs of the high demand power necessary for drawn arc welding. However, note only one power source is shown and that both of the welding devices A and B are connected in parallel to the two terminals 11 and 12 which originate from this power source P.

The following description will be directed to the welding device A and it is understood that the device B is substantially identical. The interlock relay system, which is particularly unique, is set forth in the drawing within the dotted outline area indicated by the reference numeral 13. The balance of the wiring diagram, although adapted in part to function with this interlock system, is only representative of one of many wiring diagrams which may be protected by the new interlock relay of this invention.

A workpiece 14 is connected to the terminal 12. The member to be welded is indicated by the pointed symbol 15. Generally these devices are employed to weld studs and hence the description hereafter will refer to a stud 15. The stud 15 is connected to the terminal 11 through a solenoid lifting coil and a cable 16 containing a switch 40. It is this area of the drawing that is most schematic, because welding devices vary in construction radically as to whether a solenoid lifting coil is provided to operate in series with the cable 16 to carry full welding power, or whether a lifting coil shall be separately powered through another circuitry between the terminals 11 and 12. Hence, the drawing illustrates a simple series lifting coil only for the purpose of illustration.

The basic components of the illustrated circuit consist of a contact relay indicated by the reference letters CR, which operates a series of switches, and a time delay device indicated by the reference letters TD. The contact relay CR sets in motion a series of events and the time delay device TD, after a predetermined period of time, brings the welding cycle to an end. Relay CR is a magnetically operated switch operating normally open poles or switches 20 and 30. The preferred time delay device operates on a pneumatic principle. When the coil of TD is energized, air is allowed to bleed slowly into a timing head. Adjustment of a needle valve in the timing head increases or decreases the rate of air flow to alter the timed interval. When the air times out, the device causes a switch to operate. In the illustrated welding device, TD operates a double-pole, double-throw switch 17, having contacts 50 and 60. The contacts 50 are normally closed by switch 17, and when TD times out, contacts 50 are opened and contacts 60 are closed.

A solenoid C is provided to operate the switch 40.

Generally, switch 40 and solenoid C are together referred to as a contactor because it is a magnetically operated switch capable of breaking much higher current than a relay.

The components are interrelated by circuitry to carry out the functions of a stud welding device. By energization of the relay CR through the contacts 50 of the timer device TD, and at the same time initiating operation of the timer TD, the switch 20 will close to energize the solenoid C and close the switch 40. Thus, the stud 15 will lift and a welding arc will be established.

Thereafter, when TD times out, the contacts 50 will open to de-energize the contactor solenoid C and end the weld cycle.

To provide the improved interlock objects of this invention, an interlock relay system is indicated within a dotted block outline referred to by the reference character 13. Within the block 13 there is provided a relay coil indicated by the reference letters IR which operates a normally open contact switch 10. A variable resistor R is series connected with relay IR and with a switch S. Switch S is a control button on the welding gun under the manual control of the operator. When the switch S is closed, the interlock relay is thrown across the lines extending from terminals 11 and 12. By adjustment of the resistor R the relay IR may be adjusted to operate only at a desired voltage and hence, is voltage sensitive. Thus, if the voltage in the terminals 11 and 12 is less than the desired minimum for the welding apparatus, the relay IR will fail to operate. If the voltage is sufficiently high the relay will operate and will close the switch 10.

Assuming a condition of sufficient welding voltage at the terminals 11 and 12 whenever switch button S is depressed, relay IR will close switch 10 and a circuit will be completed from terminal 11 through the switch 10 and through the normally closed contacts 50 to the contact relay CR and through the line 18 to the extension from terminal 12. Hence, contact relay CR will be actuated to close the pole switches 20 and 30.

Also, simultaneously with energization of the contact relay, the time delay device TD will be initiated, but will be inoperative to throw the switch 17 until the proper time delay period.

After closing of the switches 20 and 30, and while TD is timing but inoperative, the solenoid C will be activated through the switch 20 to close the contacts 40, and complete the circuit through the coil and lead 16, stud 15 and workpiece 14.

The drop in voltage brought about by the closing of the contacts 40 is more than sufficient to lower the voltage below the sensitivity of the relay IR. Therefore the pole switch 30 operating through a lead line 23 is provided to bridge the switch 10 and prevent premature de-activation of the contact relay CR and the time delay device if switch S is released.

After the timing device TD causes switch 17 to open the contacts 50 and close the contacts 60, the contact relay CR is de-energized and hence the circuits through the switches 20 and 30 are broken to permit the contactor solenoid C and the contacts 40 to return to the position illustrated in the drawing and bring the welding cycle to an end. If, at the time the switch 17 opens, the contacts 50, the operator should still have the gun switch S depressed, and if switch 10 is open, a new cycle would be initiated immediately and the result would be a rapid series of cycles referred to in the trade as "motor boating." To avoid such "motor boating" effect a lead 22 bridges the switch 10 through the contacts 60 and thereby supplies a circuit to maintain energization of the coil of the time delay switch and prevent closing of the contacts 50 until after the switch S has been released.

It is necessary that the voltage between the terminals 11 and 12, which is supplied to the welding device, be within close limits in order to insure consistent welding. Hence, it is imperative that the welding device begin operating only when the source P is producing the desired welding potential. Obviously, if two such devices as the welders A and B were to be initiated simultaneously, or if B were to be initiated while A is still in operation, a serious discrepancy in welding power will result and destroy at least one, if not both, of the welds. It is entirely possible when a plurality of operators are working rapidly to have an occasional simultaneous closing of gun buttons S. The term "simultaneous" is meant to convey the meaning of operation so closely related that both welding devices would be drawing power for full welding at one time. Literally, it is virtually an impossibility to close the gun buttons S at the same current cycle and hence, one operation will lag behind the other by a portion of a cycle.

From the foregoing description it will be evident that an electrical device embodying the tuned interlock relay system will be inoperative until there is sufficient line power to pass current through the switch operated by this tuned system and hence prevent simultaneous operation.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a system having an electrical power source with first and second terminals of a rated voltage potential across said terminals, said voltage potential being subject to drop under load, and said system having at least two operating devices powered by said power source, the provision of an improved means associated with each device to prevent current flow in such device at less than rated voltage, said means comprising a voltage sensitive relay switch, said relay switch connected in a control circuit across said terminals and thereby subjected to voltage variances of said terminals, a master switch in said control circuit, and a control switch for the associated device operated by said relay switch, said relay switch tuned to a preselected voltage above which it will cause the control switch to assume a first position and below which it will cause the control switch to assume a second position. whereby upon closing of said master switch the relay switch will sense the voltage and will pass current therethrough only if the voltage is above a pre-determined minimum.

2. In a system having an electrical power source with first and second terminals of a rated voltage potential across said terminals, said voltage potential being subject to drop under load, and said system having at least two operating devices powered by said power source, the provision of an improved means associated with each device to prevent current flow in such device at less than rated voltage, said means comprising, a master switch, a voltage sensitive device, and a circuit switch, said circuit switch having an operative condition directing operating current to the device and having an inoperative condition, said voltage sensitive device being in operative control of said circuit switch, said master switch and said voltage sensitive device being in a circuit across the poles of said power source and therefore subject to voltage variances produced in said first and second power source terminals, said voltage sensitive device being tuned to shift said circuit switch from said inoperative to said operative condition upon closing of said master switch only whenever the voltage of the circuit is above a preselected value.

3. In a system having an electrical power source with first and second terminals of a rated voltage potential across said terminals, said voltage potential being subject to drop under load, and an operating device powered by said source, the provision of an improved means to prevent current flow in said device whenever the said potential is below a preselected voltage, comprising, a slave switch in control of said device, a voltage sensing means responsive to voltage across said terminals, means providing operative control of said slave switch from said voltage sensing means, and a master switch and circuit connecting said operating device across said terminals through said slave switch.

4. In a welding system having an electrical power source with first and second terminals of a rated voltage potential across said terminals and having at least two drawn-arc welding devices in parallel across said terminals, said voltage potential being subject to drop under load, each said welding device having circuitry and controls producing a momentary surge power demand which causes a momentary voltage drop across the terminals of said power supply, the provision of an improved voltage sensitive interlock which will prevent current flow in any one welding device after another device has begun a weld cycle, comprising, in each device, a normally open initiating switch in said circuitry of the welding device, said initiating switch being related to the said circuitry to set up a series of inter-related controlled welding steps when closed, a voltage sensitive relay in operative control of said initiating switch, said voltage sensitive relay being operative from said open to a closed position only above a preselected voltage, and a circuit including a manual control switch connecting said voltage sensitive relay across said terminals.

References Cited in the file of this patent

UNITED STATES PATENTS

| | | |
|---|---|---|
| 1,621,069 | Holslag | Mar. 15, 1927 |
| 1,708,072 | Alexander | Apr. 9, 1929 |
| 2,642,515 | Bagg | June 16, 1953 |